United States Patent Office 2,743,291
Patented Apr. 24, 1956

2,743,291
NEW CYANOAMINONITRILES

Peter L. de Benneville, Philadelphia, Pa., assignor to Rohm & Haas Company, Philadelphia, Pa., a corporation of Delaware No Drawing. Application March 12, 1952,
Serial No. 276,232

6 Claims. (Cl. 260—465.5)

This invention relates to a process of making a new type of cyanoaminonitrile having the general formula:

$$R-N-\underset{\underset{R_2}{|}}{\overset{\overset{R_1}{|}}{C}}-CN$$
$$\phantom{R-N-}CN$$

wherein R represents an alkyl group of one to eight carbon atoms having at least one hydrogen atom on the carbon atom adjacent the nitrogen atom, $R_1$ is hydrogen or methyl and $R_2$ is an alkyl group of one to eight carbon atoms. The process consists of reacting an aminonitrile having the appropriate substituent groups with cyanogen chloride under alkaline conditions in accordance with the equation:

(1)
$$R-\underset{\underset{H}{|}}{\overset{\overset{R_1}{|}}{N}}-\underset{\underset{R_2}{|}}{\overset{|}{C}}-CN + ClCN \xrightarrow{base} R-\underset{\underset{CN}{|}}{\overset{\overset{R_1}{|}}{N}}-\underset{\underset{R_2}{|}}{\overset{|}{C}}-CN + HCl$$

The aminonitrile used in this process may be made by the reaction of a suitable primary amine $RNH_2$ with a suitable carbonyl compound $$R_1-\overset{\overset{O}{\|}}{C}-R_2$$

and hydrogen cyanide in accordance with the equation (2)
$$RNH_2 + \underset{\underset{R_2}{|}}{\overset{\overset{R_1}{|}}{C}}=O + HCN \longrightarrow R-\underset{\underset{H}{|}}{\overset{\overset{R_1}{|}}{N}}-\underset{\underset{R_2}{|}}{\overset{|}{C}}-CN + H_2O$$

Suitable primary amines are methylamine, ethylamine, propylamine, isopropylamine, n-butylamine, iso-butylamine, sec.-butylamine, 2-ethylhexylamine. Suitable carbonyl compounds are those in which $R_1$ is hydrogen or methyl and $R_2$ is methyl, ethyl, propyl, up to octyl. Representative carbonyl compounds which are commercially available or which can be economically produced are acetaldehyde, propionaldehyde, nonyl aldehyde, acetone and methyl ethyl ketone.

Instead of the three-component reaction represented by Equation 2 it is sometimes desirable to produce the aminonitrile by first forming a cyanohydrin and then reacting the cyanohydrin with the amine according to the equations:

(3)
$$\underset{\underset{R_2}{|}}{\overset{\overset{R_1}{|}}{C}}=O + HCN \longrightarrow HO-\underset{\underset{R_2}{|}}{\overset{\overset{R_1}{|}}{C}}-CN$$

(4)
$$RNH_2 + HO-\underset{\underset{R_2}{|}}{\overset{\overset{R_1}{|}}{C}}-CN \longrightarrow R-\underset{\underset{H}{|}}{\overset{\overset{R_1}{|}}{N}}-\underset{\underset{R_2}{|}}{\overset{|}{C}}-CN$$

These aminonitriles are relatively stable monomeric materials that readily react with cyanogen chloride in the manner represented by Equation 1. Other cyanogen halides such as the bromide may be used in place of the chloride. The reaction is carried out on the alkaline side in the presence of an inert solvent such as benzene at room temperature or slightly above room temperature up to 50° C. The reaction is exothermic and should be carried out in reactors equipped with cooling means. The alkalinity of the reaction medium should be maintained by the addition of sufficient basic substance to combine with the acid formed during the reaction. Otherwise half the amine present will be consumed in neutralizing the acid and will not be available for the primary reaction. Suitable basic substances are sodium hydroxide, potassium hydroxide, the corresponding carbonates and lime. The manner in which the invention may be practiced is illustrated by the following examples.

Example 1

A.—Preparation of $$CH_3-\underset{\underset{H}{|}}{\overset{\overset{H}{|}}{N}}-\underset{\underset{CH_3}{|}}{\overset{|}{C}}-CN$$

A benzene solution of 34 parts of methylamine is cooled to 5° C. in a vessel equipped with a stirrer, a cooling jacket and an ice water condensing system. Forty-seven parts of acetaldehyde was added over a period of one-half hour and then 29.5 parts of anhydrous hydrogen cyanide was added over a period of fifteen minutes. Stirring and cooling were maintained during these additions, and thereafter the stirring was continued for one hour while the reaction mixture was allowed to come to room temperature. It was allowed to stand overnight at room temperature. The benzene layer was then separated and distilled to yield 44 parts of water-white aminonitrile boiling at 70°–78° C. at 34 mm.

B.—Preparation of $$CH_3-\underset{\underset{CN}{|}}{\overset{\overset{H}{|}}{N}}-\underset{\underset{CH_3}{|}}{\overset{|}{C}}-CN$$

To a solution of the 44 parts of aminonitrile as prepared in part A in 80 parts of benzene there was added first 16 parts of cyanogen chloride, then 36.5 parts of anhydrous potassium carbonate in 32 parts of water, and finally additional 16.2 parts of cyanogen chloride. The solution was stirred during these additions and external cooling means applied. The rate of addition was adjusted to keep the temperature below 35° C. Stirring was continued for one and one-half hours after all ingredients were added, and the benzene layer was then separated and distilled to yield 46 parts of the cyanoaminonitrile. (Distillation range 112°–114° C./5 mm.)

Example 2

A.—Preparation of $$CH_3-\underset{\underset{H}{|}}{\overset{\overset{CH_3}{|}}{N}}-\underset{\underset{C_2H_5}{|}}{\overset{|}{C}}-CN$$

One hundred forty-four parts of methyl ethyl ketone containing one part of piperidine was placed in a reaction vessel equipped with a stirrer and to it was added over a period of 45 minutes 108 parts of anhydrous HCN. During the addition the temperature of the mixture was in the range 25°–45° C. Stirring was continued at room temperature for one and three-quarter hours after all of the HCN was added. The mixture was then acidified with 85% $H_3PO_4$ and stripped of excess HCN at 30° C. and water pump vacuum. Fifty-six parts of HCN were removed. To the cyanohydrin thus formed, there was added 62.8 parts of gaseous methylamine in one and three-quarter hours at 7°–15° C. The resulting product distilled mainly at 75°–77° C. at 28 mm. A 68% yield of aminonitrile was obtained as a colorless liquid.

B.—Preparation of

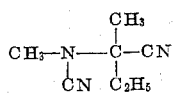

To a solution of 117.5 parts of the aminonitrile as prepared in part A in 125 parts of benzene there was added a solution of 64.4 parts of cyanogen chloride in 55 parts of benzene. The addition was made over a period of 45 minutes during which the mixture was at a temperature within the range 25°–35° C. A solution of 69 parts of anhydrous potassium carbonate in 70 parts of water at a temperature of 20°–25° C. was then added over a period of 15 minutes. The mixture was stirred for one-half hour at room temperature and 15 minutes at 50° C. and then filtered to remove KCl. The benzene layer was distilled and yielded 71 parts of the cyanoaminonitrile, a light yellow oil distilling at 80°–81° C. at 0.8 mm.

*Example 3*

A.—Preparation of

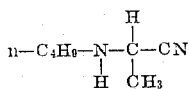

One hundred twenty and one-half parts of butylamine was placed in a reaction vessel equipped with stirrer and external cooling means. To this 106.5 parts of lactonitrile was added over a period of one-half hour. The temperature of the mixture was within the range 27°–40° C. The reaction mixture was stirred for one hour at room temperature and then one-half hour at 50° C. Some water was present as a lower layer and more was separated by the addition of benzene. A total of 16.3 parts of water was separated. The upper oil layer was distilled yielding 170.4 parts of aminonitrile. It is a pale yellow oil boiling at 95°–97° C. at 31 mm.

B.—Preparation of

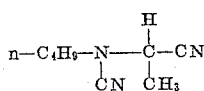

To a solution of 46.1 parts of cyanogen chloride in 44 parts of benzene there was added over a period of 30 minutes a solution of 94.5 parts of aminonitrile as prepared in part A dissolved in 110 parts of benzene. The mixture was stirred throughout the addition and the temperature was kept within the range 20°–35° C. A solution of 51.7 parts of anhydrous potassium carbonate in 53 parts of water was then added over a period of 25 minutes during which the temperature was kept between 25°–35° C. Stirring was continued for one and one-half hours at room temperature. The mixture was filtered and the benzene layer distilled. Ninety-seven and two-tenths parts of cyanoaminonitrile was obtained as a very pale yellow oil boiling at 111°–112° C. at 1.1 mm.

*Example 4*

A.—Preparation of

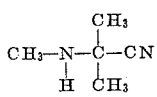

Over a period of two hours 132.2 parts of gaseous monomethylamine was added to 340.4 parts of acetone cyanohydrin. During the addition, the temperature was kept in the range −10° C. to +10° C. The reaction mixture was then stripped at room temperature and used in part B without further purification.

B.—Preparation of

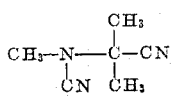

The crude aminonitrile as prepared in part A was mixed at 10° C. with 352 parts of benzene, 276.8 parts of anhydrous potassium carbonate and 128 parts of water. There was then added at 15°–25° C. and over a period of 65 minutes, 246 parts of cyanogen chloride. Stirring was continued for one-half hour at room temperature and the reaction mixture allowed to stand overnight. It was then heated to 50° C., cooled, the aqueous layer separated, and the benzene layer filtered, dried over anhydrous magnesium sulfate and distilled. There was obtained 213.5 parts of a light brown oil boiling at 89°–90° C. at 2 mm.

*Example 5*

A.—Preparation of

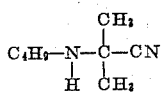

Over a period of 15 minutes and at a temperature of 25°–40° C., 127.4 parts of acetone cyanohydrin was added to 120.5 parts of n-butylamine. Stirring was continued for 75 minutes at room temperature and then for 30 minutes at 50° C. The reaction mixture was cooled to room temperature and benzene added. Seventeen parts of water was separated. The benzene layer was distilled and yielded 182 parts of aminonitrile as a pale yellow liquid boiling at 86°–88° C. at 28 mm.

B.—Preparation of

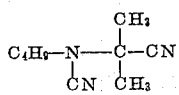

To a stirred solution of 44 parts of benzene and 30.8 parts of cyanogen chloride there was added a solution of 71.3 parts of aminonitrile prepared as in part A in 88 parts of benzene. The addition was made at 20°–40° C. over a period of 30 minutes. A solution of 34.5 parts of anhydrous potassium carbonate in 35 parts of water was then added in 15 minutes at 28°–35° C. The reaction mixture was stirred for two hours at room temperature and 15 minutes at 50° C. It was then cooled, filtered, and the benzene layer distilled. Forty-five parts of cyanoaminonitrile was obtained as a pale yellow liquid boiling at 96° C. at 1 mm.

*Example 6*

A.—Preparation of

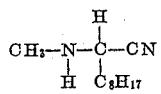

To a mixture of 166 parts of 3,5,5-trimethylhexaldehyde cyanohydrin and 40 parts of benzene there was added 32.5 parts of methylamine. The addition was made at 15°–20° C. over a period of 1.5 hours. The addition of more benzene caused the separation of 16 parts of water which was removed. The benzene layer was then dried over anhydrous sodium sulfate and stripped at 100° C. at 18 mm. There was obtained 168.8 parts of the aminonitrile.

B.—Preparation of

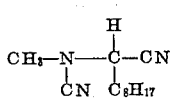

A solution of 98.6 parts of the above aminonitrile in 40 parts of benzene was added at 10°–20° C. and over a 30 minute period to a solution of 33.9 parts of cyanogen chloride in 40 parts of benzene. To this mixture was then added at 10°–15° C. and over a 15 minute period a solution of 34.5 parts of potassium carbonate in 40 parts of water. The reaction was stirred at room temperature for one hour, filtered, and the water layer separated. The benzene layer was distilled to yield 90.5 parts of the cyanoaminonitrile boiling at 133°–140° C. at 1.5 mm.

*Example 7*

A.—Preparation of

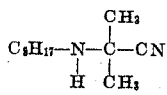

To 68 parts of 2-ethylhexylamine there was added rapidly at 25°–45° C., with cooling, 59.5 parts of acetone cyanohydrin. After the mixture was stirred one hour it was stripped to yield 96 parts of the aminonitrile.

B.—Preparation of

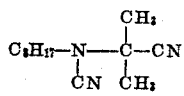

A suspension was formed by stirring 39 parts of the aminonitrile of part A, 40 parts of benzene, and 14.5 parts of anhydrous potassium carbonate in 30 parts of water. Into this suspension was passed 13.6 parts of cyanogen chloride gas over a period of 20 minutes. The water layer was separated, and the benzene layer dried and distilled. Ten parts of the cyanoaminonitrile boiling at 136°–146° C. at 4.5 mm. were obtained.

The cyanoaminonitriles as thus prepared are characterized by their stability towards alkali, which contrasts markedly with the instability of corresponding compounds where both $R_1$ and $R_2$ are hydrogen. The defined group of compounds may therefore be successfully combined with dicyanodiamide in the alkali catalyzed reaction.

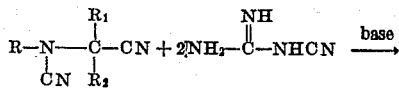

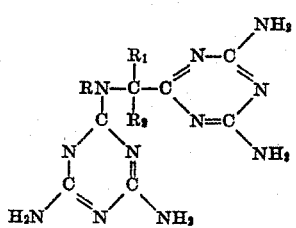

as is more fully described in our copending application Serial No. 276,231, filed on even date herewith, now Patent No. 2,675,383.

This reaction is carried out in an inert solvent such as a lower alcohol and in the presence of a small amount of alkaline catalyst. The reaction is carried out at the reflux temperature and is usually accompanied by an exotherm. The bis-(aminotriazine) precipitates from the reaction medium as it is formed and is readily freed from excess dicyanodiamide by a hot water wash.

The bis-(aminotriazine) in turn may be combined with formaldehyde or formaldehyde and an alcohol to yield useful resinous condensation products. Such products are described in copending application Serial No. 276,233, filed on even date herewith, now Patent No. 2,653,143.

I claim:

1. As a new composition of matter a cyanoaminonitrile of the formula

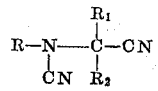

in which R is an alkyl group of one to eight carbon atoms, $R_1$ is selected from the group consisting of hydrogen and methyl and $R_2$ is an alkyl group of one to eight carbon atoms.

2. As a new composition of matter a cyanoaminonitrile of the formula

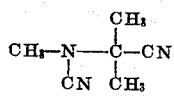

3. As a new composition of matter a cyanoaminonitrile of the formula

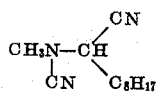

where $C_8H_{17}$ is the 2,4,4-trimethylpentyl group.

4. As a new composition of matter a cyanoaminonitrile of the formula

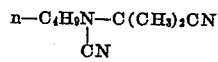

5. As a new composition of matter a cyanoaminonitrile of the formula

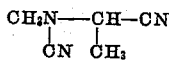

6. As a new composition of matter a cyanoaminonitrile of the formula

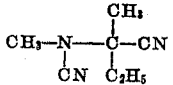

References Cited in the file of this patent

UNITED STATES PATENTS

| | | |
|---|---|---|
| 2,249,135 | Heckenbleikner et al. | July 15, 1941 |
| 2,268,108 | Collie et al. | Dec. 30, 1941 |

OTHER REFERENCES

Braun: Ber. Deut. Chem., vol. 40, pp. 3933–42 (1907).
Braun: Ber. Deut. Chem., vol. 41, pp. 2113–5 (1908).